A. G. NEVILLE.
LOCKING DEVICE FOR MOTOR VEHICLES.
APPLICATION FILED NOV. 8, 1916.
1,226,241.
Patented May 15, 1917.
2 SHEETS—SHEET 1.
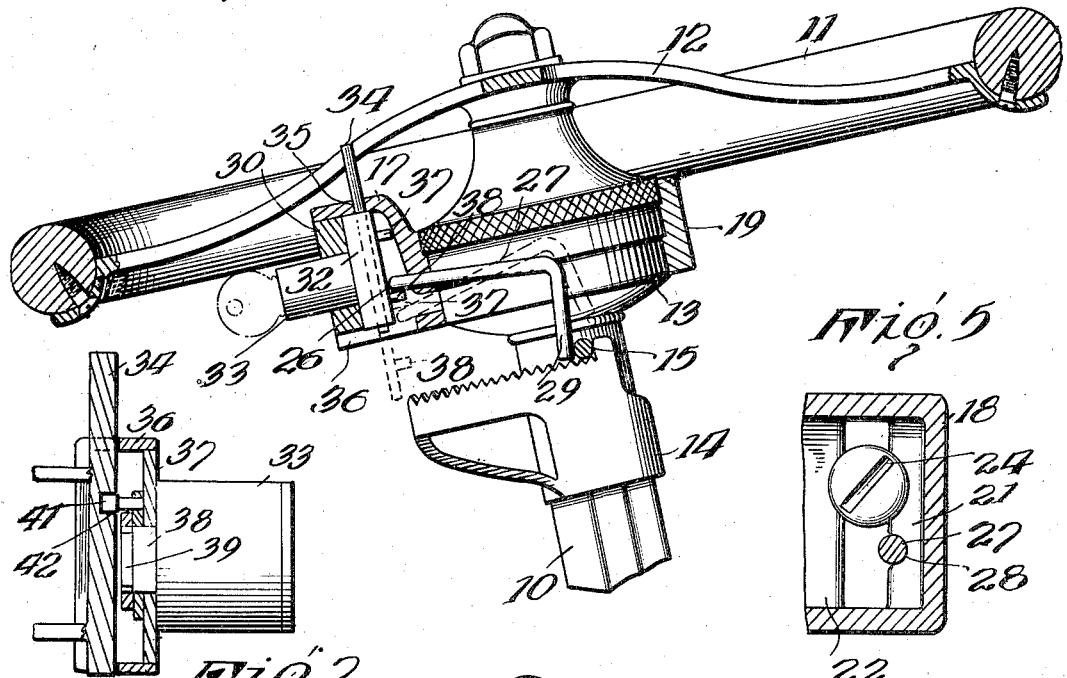

A. G. NEVILLE.
LOCKING DEVICE FOR MOTOR VEHICLES.
APPLICATION FILED NOV. 8, 1916.
1,226,241.
Patented May 15, 1917.
2 SHEETS—SHEET 2.
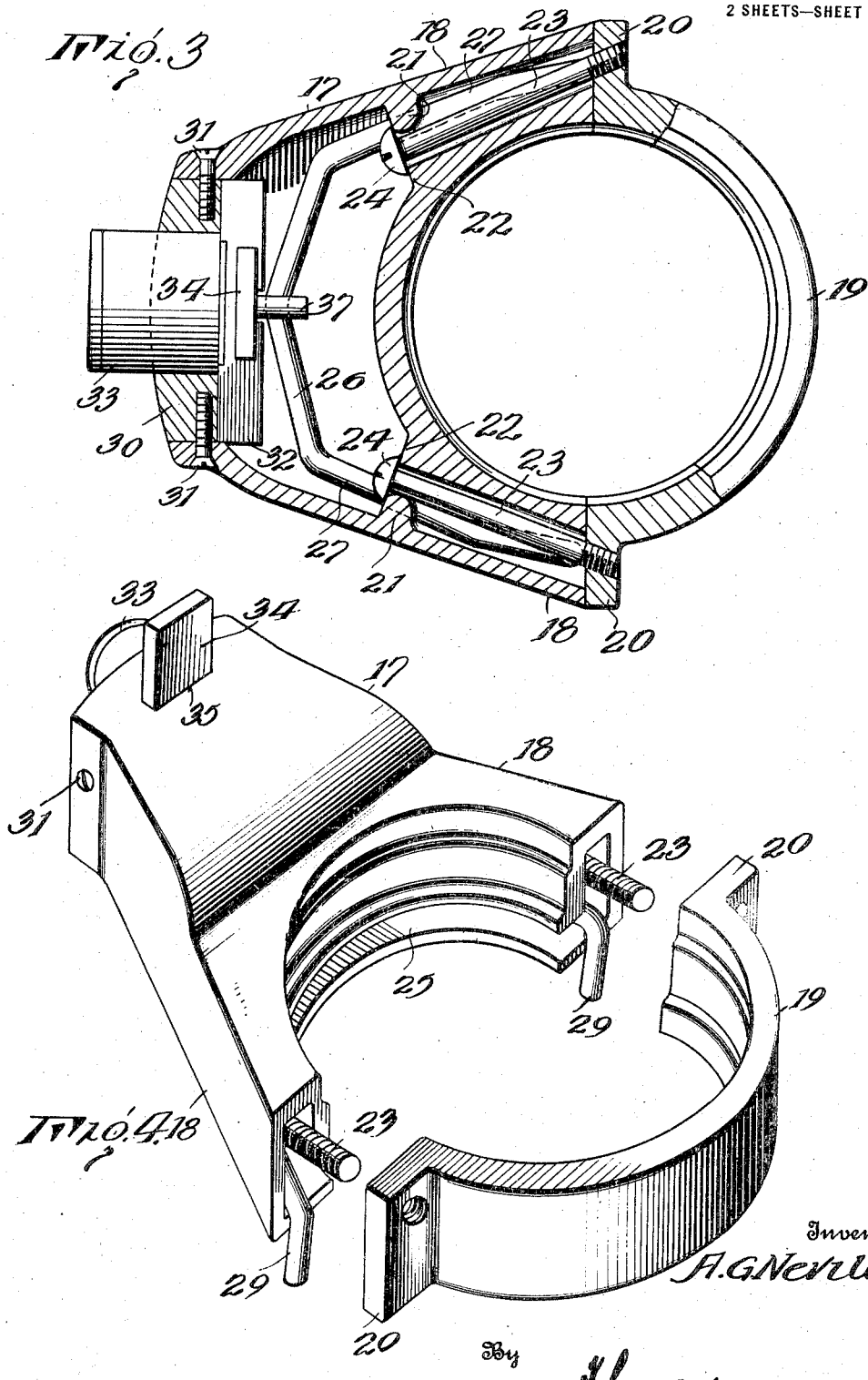
Inventor
A.G.Neville

UNITED STATES PATENT OFFICE.

ASA G. NEVILLE, OF WELLSBURG, WEST VIRGINIA.

LOCKING DEVICE FOR MOTOR-VEHICLES.

1,226,241. Specification of Letters Patent. Patented May 15, 1917.

Application filed November 8, 1916. Serial No. 130,212.

*To all whom it may concern:*

Be it known that I, ASA G. NEVILLE, a citizen of the United States, residing at Wellsburg, in the county of Brooke and State of West Virginia, have invented certain new and useful Improvements in Locking Devices for Motor-Vehicles, of which the following is a specification.

This invention relates to an improved locking device for motor vehicles and has as its primary object to provide a device of this character wherein with a single lock, the steering wheel of the vehicle and the control levers thereof, may all be secured against movement.

The invention has as a further object to provide a device of this character adapted for attachment to the steering post of the vehicle and provided with a lock with the bolt thereof operable to lock the steering wheel of the vehicle and arranged to coöperate with a locking element operable by the bolt for simultaneously locking the control levers of the vehicle.

The invention has as a still further object to provide a device of this character wherein the fastening devices employed for connecting the device with the steering post will be concealed within the body of the device and wherein the said body will be closed by the lock so that the said fastening devices cannot be removed until the lock has been displaced, this arrangement tending to make it impossible to disconnect the device from the steering post so that the vehicle can be operated.

And the invention has as a still further object to provide an arrangement wherein the locking element for the control levers will be practically concealed within the body of the device and also wherein the lock employed will be so mounted that the said lock can be removed from the body of the device only when unlocked, this arrangement further tending to make it impossible to take the device apart to be removed from the vehicle.

Other and incidental objects will appear as the description proceeds and in the drawings wherein I have illustrated the preferred embodiment of the invention and wherein similar reference characters designate corresponding parts throughout the several views:

Figure 1 is a sectional view showing my improved device applied to the steering post of a conventional type of motor vehicle and illustrating the manner in which the bolt of the lock is projectable between the spokes of the steering wheel to lock the said steering wheel against operation, Fig. 2 is a fragmentary front elevation showing the manner in which the locking element of the device is operable to engage the control levers of the vehicle for locking the said levers against movement, Fig. 3 is a horizontal sectional view showing the device detached and illustrating the mounting of the locking element for the control levers, the mounting of the lock, and the mounting of the fastening devices for connecting the device with the steering post of the vehicle, Fig. 4 is a perspective view showing the device detached and illustrating the slot formed in the body of the device for receiving the locking member therein, Fig. 5 is a fragmentary sectional view illustrating the manner in which the reinforcing ribs within the body of the device are notched to pivotally receive the locking element for the control levers.

Fig. 6 is a plan view particularly showing the coacting plates carried by the inner terminal of the lock shank for actuating the bolt of the lock, the bolt and the sections of the lock casing carrying the said bolt being shown in dotted lines, and Fig. 7 is a sectional view of the lock casing with the barrel of the lock shown in elevation, this view particularly illustrating the manner in which the bolt is engaged for actuation.

In order that the construction, mounting and operation of my improved locking device may be clearly understood, I have, in the drawings, illustrated the device in connection with a steering post 10 of a conventional type of motor vehicle. The post 10 carries a steering wheel 11 having a plurality of radial spokes 12 and is provided with an annular gear box 13 associated with the said steering wheel. Mounted upon the post below the gear box is a rack segment 14 coöperating with the control levers of the vehicle, the throttle lever being indicated at 15 and the spark lever at 16. As will be readily understood, these levers are moved around the segment 14 in the usual manner for operating the vehicle.

Coming now more particularly to the subject of the present invention, my improved device includes a hollow body or casing 17 open at its ends and formed at one extremity with reduced hollow arms 18. The body is cut away between the said arms to fit around the gear casing 13 in the manner particularly shown in Fig. 1 with the outer terminal of the body extending rearwardly beneath the steering wheel. Coöperating with the arms 18 is a half bearing or attaching member 19 formed at its extremities with laterally directed lugs 20 seating against the terminals of the said arms to close the arms with the said half bearing fitting around the casing 13 for supporting the device in position. At the inner extremities of the arms 18 the body 17 is interiorly formed at opposite sides thereof with transversely extending ribs 21 and confronting these ribs are shoulders 22. Bolts or other suitable fastening devices 23 are inserted through the arms from the outer open end of the body to engage the heads 24 of the said bolts with the said ribs and shoulders, with the outer extremities of the bolts screw threaded into the lugs 20 of the half bearing 19. The heads 24 of the bolts are formed to receive a screw-driver or other operating tool and it will be observed that by inserting the said tool through the outer end of the body, the bolts may be rotated for clamping the device upon the gear casing and thus connecting the said device with the steering post.

As particularly shown in Fig. 4 of the drawing, the body 17 between the arms 18 is formed adjacent its lower side with a substantially semi-circular slot 25 and removably fitted through this slot to be received within the body is an approximately U-shaped yoke or locking element 26. This locking element is preferably formed from a length of suitable resilient rod and is arranged with the arms 27 thereof extending through the arms 18 of the body with the bight of the said locking element disposed adjacent the outer end of the body. As will be best observed upon reference to Fig. 5, the ribs 21, adjacent the lower extremities thereof, are formed with notches or seats 28 which pivotally receive the arms 27 of the locking element and support the said element for rocking movement within the body. The arms 27, at their outer extremities are bent to provide laterally projecting stop members or lugs 29 which depend freely through suitable notches formed in the bottom wall of the body 17 and are loosely received between the terminals of the arms 18 and the lugs 20 of the half bearing 19. These stop members are, when the levers 15 are moved to normal closed position, projectable as particularly shown in Figs. 1 and 2, in front of the said levers.

Removably fitted in the outer open end of the body 17 to close the said body is a block 30, connected with the body by screws or other suitable fastening devices 31 engaging opposite ends of the block. Mounted upon this block is a suitable lock having a casing 32 confronting the inner face of the block to be secured thereto in any approved manner with the barrel 33 of the lock projecting out through the said block. The lock is provided with a bolt 34 operable to slide vertically through the casing 32 and projectable upwardly to active position out through an opening 35 in the body 17. Preferably, the lock is first connected with the block 30 when the said block is then fitted into the open end of the said body. During this operation, the bolt 34 of the lock is, of course, moved to inactive position, as shown in dotted lines in Fig. 1 so that the upper end of the bolt may be received within the outer end of the body and the bottom wall of the body is, as also shown in Fig. 1, provided, at its outer end, with a notch or opening 36 for freely receiving the lower extremity of the bolt so that the block 30 with the lock may be slidably fitted into the body to be secured in position. Extending laterally from the inner face of the bolt 34 and slidably received within a suitable slot in the casing 32 of the lock, are spaced pins or lugs 37 and 38 respectively, engaging over opposite sides of the bight of the locking element 26.

When it is desired to operate the vehicle, the bolt 34 of the lock is, of course, moved to inactive position, as shown in dotted lines in Fig. 1, when the pin 37 of the said bolt will engage the locking element 26 to rock the said element upon the ribs 21 and raise the stop lugs 29 from in front of the operating levers 15 and 16 so that these members may be shifted about the segment 14 in the usual manner. To lock the vehicle, the lock is operated to shift the bolt 34 upwardly to active position. This movement of the bolt will cause the pin 38 to engage the locking element 26 and rock the said element upon the ribs 21 to shift the stop lugs 29 downwardly to a position in front of the operating levers 15 and 16, as particularly shown in Fig. 2, and consequently simultaneously lock these levers in their normal positions against movement with respect to the segment 14. At the same time, the bolt 34 will be projected to a position between the spokes 12 of the steering wheel 11 so that the said steering wheel will be simultaneously locked against operation. Accordingly, with a single lock, I provide an arrangement wherein the steering wheel and the spark and gas throttle levers for the vehicle may all be simultaneously rendered inactive.

Attention is now directed to the fact that the bolts 23 are concealed within the body 17 and can be removed only by first removing the block 30. When the lock is actuated to lock the vehicle the bolt 34 will project through the opening 35 in the body 17 for also locking the block 30 upon the body. Consequently, even though the screws 31 be removed, the said block cannot be displaced. It will therefore be seen that when the vehicle is locked, the block 30 cannot be removed to displace the lock and gain access to the locking element 26 nor can the bolts 23 be reached for disconnecting the device from the vehicle. I accordingly provide a particularly efficient construction for the purpose set forth and a device which may be readily applied to any conventional type of vehicle having a steering wheel and control levers of the character described.

The lock casing 32, is, as particularly shown in Fig. 7, formed with a body section 36′ having a closure section 37′ detachably secured thereto. This section 37′ carries the barrel 33 of the lock. Projecting from the said barrel freely through the section 37′ is the rotatable shank 38′ of the lock provided, at its adjacent extremity with a reduced terminal 39. Loosely fitted over the inner terminal of the shank 38′ to lie against the casing section 37′, is a plate 40 particularly shown in Fig. 6. This plate is free with respect to the lock shank and is provided at one side with a laterally projecting pin 41 fitting loosely in a transverse slot 42 in the bolt 34. Projecting laterally from the plate 40, at opposite sides of the pin 41, are stop pins 43 and 44 respectively. Fitted over the reduced terminal 39 of the lock shank 38′ and formed to snugly receive the said terminal is an operating plate 45 connected with the lock shank by screws or other suitable fastening devices, as particularly shown in Fig. 6 and provided, at one side, with a laterally extending lug 46. The plate 45 will, of course, move with the lock shank as the said shank is rotated by the key of the lock and the lug 46 is arranged for selective engagement with the pins 43 and 44 when the said lock shank is so rotated.

Arranged to coöperate with the plate 40, are stop pins 47 and 48 respectively, projecting inwardly from the casing section 37′ adjacent one side of the lock shank. The casing section 36′ is, at opposite sides of the bolt 34, provided with inwardly extending posts 49 and 50 projecting toward the casing section 37′ to receive screws or other suitable fastening devices extending through the said last mentioned section for detachably connecting the lock sections. Arranged between the post 49 and the adjacent edge of the bolt 34 is a bowed spring 51 slidably engaging the bolt for tensioning the said bolt in its movement through the lock casing. Considering the bolt 34 to be in active position as shown in Figs. 6 and 7, it will be assumed that it is desired to throw the bolt to inactive position.

The key for the lock is inserted in the barrel 33 in the usual manner and the said key rotated in a clockwise direction which will accordingly rotate the lock shank 38′ and turn the lug 46 upon the plate 45 in the direction of the pin 44 upon the plate 40. The lug 46 upon being moved to engage the pin 44 will then rotate the plate 40 causing the pin 41 to move within the slot 42 of the bolt 34 and throw the said bolt downwardly, the extreme downward movement of the said bolt being limited by the engagement of the plate 40 with the pin 48. For throwing the bolt to active position, the key of the lock is thrown in a counter-clockwise direction and accordingly moves the lug 46 of the plate 45 to engage the pin 43 upon the plate 40. The said lug will then rotate the plate to shift the pin 41 within the groove of the bolt 34 to throw the bolt upwardly. As particularly shown in Fig. 6, the extreme upward movement of the bolt is limited by the engagement of the plate 40 with the pin 47. The internal mechanism of the barrel 33 of the lock may be of any suitable type, it only being necessary that the said barrel shall be provided with a rotatable shank such as shown at 38′ for receiving the plates 40 and 45.

Having thus described the invention, what is claimed as new is:

1. A device of the character described including a body, a locking element carried thereby and shiftable to active position projecting laterally from the body, and a lock mounted upon the body for shifting the said element and provided with a bolt projectable to provide a locking member in the active position of the said element.

2. A device of the character described including a body, a locking element mounted to rock thereon in a plane at substantially right angles to the body, and a lock having a bolt projectable to active position and engaging the said element for simultaneously rocking the locking element to active position.

3. A device of the character described including a body, a locking element mounted thereon, and a lock carried by the body and removable at one end thereof, the lock being provided with a bolt projectable to lock the lock body upon the said first mentioned body and engaging said locking element for shifting the said element to active position upon the projection of the bolt.

4. A device of the character described including a hollow casing, an attaching member abutting one end of the casing, means for connecting the said attaching member with the casing and concealed in the casing, a locking element mounted within the casing, and a lock fitted in the opposite end of the casing and provided with a bolt projectable through the casing to active position and engaged with the said locking element for shifting the said element to active position upon the projection of the bolt.

5. A device of the character described including a hollow casing, a locking element mounted to rock therein and provided with spaced lugs, and a lock mounted upon the casing and provided with a bolt projectable to form a locking member and engaged with the said element for rocking the said element to active position upon the projection of the bolt with the said lugs each providing a stop member.

6. A device of the character described including a hollow casing, an attaching member abutting one end of the casing, means connecting the said member with the casing and concealed within the casing, a locking element concealed in the casing and provided with a stop member projecting through the casing, and a lock fitted in the casing at its opposite extremity and provided with a bolt projectable to lock the lock body upon the casing and engaged with said locking element for shifting the said stop member to active position upon the projection of the bolt.

7. A device of the character described including a hollow casing formed with spaced arms, an attaching member arranged to coöperate with the said arms, a locking element having arms projecting through the arms of the casing and provided with stop members with the said locking element mounted to rock within the casing, and a lock having a bolt engaged with the said locking element for rocking the said element and shifting the said stop members to active position upon the projection of the bolt.

8. A device of the character described including a hollow casing, notched ribs within the casing, a locking element having arms received by said notches for pivotally supporting the said element within the casing, and a lock having a bolt engaged with the said element for rocking the said element to active position upon the projection of the bolt.

9. A device of the character described including a hollow casing provided with arms, a substantially U-shaped locking element mounted within the casing and provided with arms projecting through the arms of the casing and pivotally mounted therein for supporting the said element for rocking movement within the casing, stop members carried by said arms, and a lock having a bolt engaged with the bight of said locking element for rocking the said element to shift the said stop members to active position upon the projection of the bolt.

10. The combination with a motor vehicle having a steering post, a steering wheel provided with a spoke, and a control lever movable with respect to the steering post, of a locking device for the vehicle including a body, means connecting the body with the steering post, a locking element mounted upon the body and provided with a stop member, and a lock carried by the body and provided with a bolt projectable to active position for engagement with the spoke of the steering wheel for rendering the steering wheel inactive and engaged with the said element for shifting the said stop member to a position for engagement with the said lever for locking the lever against operative movement upon the projection of the bolt.

11. In a device of the character described a body, a locking element carried thereby, and a lock mounted to coöperate with the said locking element, the said lock including a casing, a bolt slidably mounted upon the casing and actively engaged with the said locking element, a shank, a plate mounted upon the shank and free with respect thereto, spaced stop pins mounted upon the plate, an operating pin carried by said plate and slidably engaged with said bolt, a second plate mounted upon the shank to rotate therewith and provided with a lug for selective engagement with said stop pins for rotating the said first mentioned plate in opposite directions and shifting the said bolt to actuate the said locking element, and spaced stop pins carried by the casing for selective engagement with said first mentioned plate for limiting the bolt in its movement in opposite directions.

12. A device of the character described including a casing, an attaching member arranged to coöperate therewith, means connecting the said member with the casing, a locking element mounted upon the casing, and a lock carried by the casing and provided with a bolt shiftable to lock the lock body upon the casing for preventing removal of the said connecting means from the casing and engaged with the said locking element for shifting the said element to active position upon the projection of the bolt.

13. In a device of the character described, a body, a locking element carried thereby, and a lock mounted to coöperate with the said locking element, the said lock including a casing, a bolt slidably mounted upon the casing and actively engaged with said locking element, a shank, means carried by the shank and free with respect thereto, means carried by said first mentioned means and actively engaged with the bolt, means carried by the shank to rotate therewith, and stop means carried by said first mentioned means and engageable by said last mentioned means for rotating the said first mentioned means in opposite directions and shifting the said bolt to actuate the said locking element.

14. In a device of the character described, a body, a locking element carried thereby, and a lock mounted to coöperate with the said locking element, the said lock including a casing, a bolt slidably mounted upon the casing and actively engaged with the said locking element, a shank, means carried by the shank and free with respect thereto, means carried by said first mentioned means and actively engaged with the bolt, means carried by the shank to rotate therewith, stop means carried by said first mentioned means and engageable by said last mentioned means for rotating the said first mentioned means in opposite directions and shifting the said bolt to actuate the said locking element, and stop means carried by the casing for selective engagement with said first mentioned means for limiting the bolt in its movement in opposite directions.

In testimony whereof I affix my signature.

ASA G. NEVILLE. [L. S.]